United States Patent [19]

Adam et al.

[11] 3,922,567

[45] Nov. 25, 1975

[54] INTEGRATED IGFET BUCKET-BRIGADE CIRCUIT

[75] Inventors: Fritz G. Adam; Cornelius Obermeier, both of Freiburg; Gerhard Scheffer; Klaus Wilmsmeyer, both of Denzlingen, all of Germany

[73] Assignee: ITT Industries, Inc., New York, N.Y.

[22] Filed: Apr. 8, 1974

[21] Appl. No.: 458,615

[30] Foreign Application Priority Data

May 17, 1973 Germany .......................... 2324914

[52] U.S. Cl. ............ 307/221 C; 307/221 D; 357/23

[51] Int. Cl.$^2$ .................... G11C 19/00; H01L 29/78

[58] Field of Search ........... 307/221 C, 221 D, 304; 357/23

[56] References Cited

UNITED STATES PATENTS

| | | | |
|---|---|---|---|
| 3,745,383 | 7/1973 | Sangster | 307/221 D |
| 3,784,847 | 1/1974 | Kurz et al. | 307/221 D |
| 3,790,825 | 2/1974 | Barron et al. | 307/221 D |

*Primary Examiner*—Stanley D. Miller, Jr.
*Attorney, Agent, or Firm*—John T. O'Halloran; Menotti J. Lombardi, Jr.; Vincent Ingrassia

[57] ABSTRACT

An IGFET bucket-brigade device comprises a row of IGFETs of the depletion-layer type. The last IGFET of the row comprises a drain region provided with an electrical terminal to which a voltage is fed greater than the pinch-off-voltage and of a polarity opposite to the polarity of the clock impulse.

6 Claims, 12 Drawing Figures

INTEGRATED IGFET BUCKET-BRIGADE CIRCUIT

BACKGROUND OF THE INVENTION

Bucket-brigade circuits are shift registers suitable for the short-time storage or for delaying digital or analog signals. A bucket-brigade circuit consists of a chain-like arrangement of switching transistors and of associated capacitances, the re-charging from stage to stage being effected in the rhythm of a clock frequency. Semiconductor-technological integration lends itself favorably to realizing such circuits comprising a great number of stages.

Known bucket-brigade circuits are embodied in accordance with bipolar silicon planar technology as well as in accordance with silicon MOS technology employing metal oxide semiconductor (MOS) transistors of the enhancement type. Relative thereto, reference is made to the technical journal "Electronics" of Feb. 28, 1972, pp. 62–77.

Unlike the bipolar bucket-brigade circuit, the MOS bucket-brigade circuit features a greater technical simplicity and smaller leakage of charges. The latter enables the realization of greater numbers of stages.

It is also known, for the purpose of increasing the signal bandwidth, to design bucket-brigade circuits in accordance with MOS-n-channel technology. N-channel transistors, owing to the fact that the electron mobility is greater than that of the hole mobility, have a switching speed amounting to about three times that of the p-channel transistors. Accordingly, when using n-channel bucket-brigade circuits it is possible to achieve greater signal bandwidths than when using p-channel bucket-brigade circuits.

A further increase of the bandwidth, however, is met with considerable interest with respect to many practical applications. From the article by B. Kurz, M. B. Barron and W. J. Butler, "New Monolithic High-Speed Analog Delay Lines" as published in "IEEE Journal of Solid-State Circuits" (August 1972) page 300, it is known to realize bucket-brigade circuits by employing depletion-type field-effect transistors (JFETs) or metal-semiconductor depletion-type field-effect transistors (MESFETs). Both are field-effect transistors of the depletion-layer type and would offer the following advantages:

1. avoidance of the gate-overlap capacitances, therefore minimum reaction, greater control range and, indirectly, lower signal attenuation;
2. higher carrier mobility owing to greater channel depth and smaller surface influence, thus resulting in a higher switching speed, smaller attenuation and greater bandwidth;
3. possibility of operation with small clock pulse voltages; and
4. possibility of simultaneously reducing both the drain-to-source reaction and the depletion layer capacitance. It is considered a disadvantage of the relatively difficult JFET- or MESFET-technologies, however, that they, when applied to circuits of corresponding complexity, provide substantially smaller yields than the proven MOS-technology.

The authors of the aforementioned publication have compared the advantages of the JFET- or MESFET-bucket-brigade circuit with the properties of the MIS-bucket-brigade circuit, and in this respect reference has been made by them to the MIS-bucket-brigade circuit of the enhancement type which is the only one known up to now. The possibility that a MIS-bucket-brigade circuit might also be realized with the aid of MIS depletion-type transistors, however, has not been taken into consideration obviously because of the existing prejudice.

This prejudice might be explained as resulting from the fact that in an MIS-bucket-brigade circuit consisting of ordinary MIS depletion-type transistors with an inversion channel, there would not be obtained the advantages 2 and 4.

The possibility of using MIS depletion-type transistors with a doped channel from which at least advantage No. 4 would reslut has not been mentioned by the authors. Obviously, the prejudice with respect to the important advantage No. 2 (bulk-mobility) also extends to this structure; because also in these transistors the channel meets against the surface. However, it has not been considered that the channel, when being controlled with an increasing gate voltage, will very soon no longer be applied to the surface, but will be separated therefrom by a space charge zone. The spacing of the remaining channel from the surface will become greater as the channel approaches the pinch-off state ($U_{GS} = U_P$). Accordingly, the high bulk-mobility in the channel will finally become fully effective as the pinch-off increases. Accordingly, advantage No. 2 is achieved essentially.

SUMMARY OF THE INVENTION

It is the object of the present invention to combine the technical and economical advantages of the MOS-technology with the functional advantages of a bucket-brigade circuit consisting of depletion layer-type transistors.

The invention resides in applying a biasing potential $U_V$ to the gate of the transistors whereby it is possible, from the beginning, to prevent the surface from having an influence upon the channel.

According to a broad aspect of the inventin there is provided an integrated bucket-brigade circuit comprising a source of operating voltage; a source of clock pulses; and a row of field-effect transistors of the depletion-layer type having source and drain regions, said field-effect transistors employing gate electrodes on an insulated gate layer, wherein the last transistor in said row is provided with an electrical terminal to which said source of operating voltage is coupled, said source having polarity opposite to the polarity of said clock pulses and having magnitude greater than the pinch-off voltage of said last transistor.

The above and other objects of the present invention will be better understood from the following detailed description taken in conjunction with the accompanying drawings, in which:

DESCRIPTION OF THE PREFERRED EMBODIMENT

As field-effect transistors there are preferably used n-channel field-effect transistors, the insulated-gate layer of which at least partly consists of an oxide and/or which can be extensively manufactured by employing the well-proven process steps according to MOS-technology.

In particular, there are used field-effect transistors with a doped n-channel below the insulated-gate layer on a p-substrate, with the doped n-channel region produced by epitaxial techniques, by way of diffusion, by way of ion implantation, or else by a combination of ion implantation and diffusion. Accordingly, the channel regions contain doping impurities of the same conductivity type as the source and drain regions in a concentration lying above the impurity concentration in the substrate.

Also included, however, is the case of an MIS-depletion-type bucket-brigade circuit, in which the channel is not realized by a doped layer but by a controlled insertion of a sufficient number of positive fixed charges into the gate oxide or into the oxide semiconductor interphase on the semiconductor surface. Accordingly, there is involved a pure inversion channel, so that in this case advantage No. 2 is not obtained. The insertion of the positive charges will involve, for example, alkali ions (K, Na, Cs), the incorporation of which may be effected by way of ion implantation. On principle, the manufacture of MOS field-effect transistors by way of ion implantation, is known from the technical journal "Electronics" of Apr. 24, 1972, pp. 85–90.

The advantages of an IGFET depletion-layer type bucket-brigade circuit, however, will be fully obtained in the case of a structure comprising a doped *n*-channel.

Figure 1:
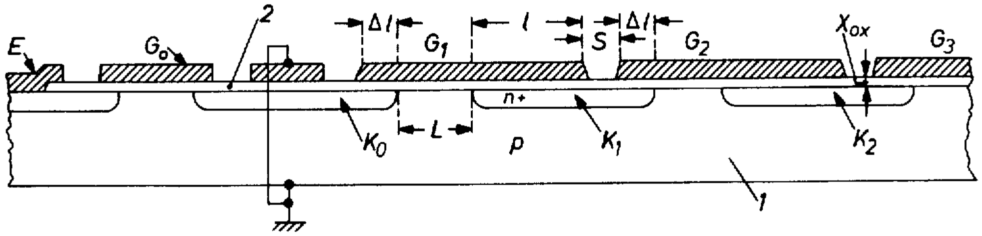
Fig.1 PRIOR ART
FIG. 1 shows an integrated bucket-brigade circuit of the n-channel enhancement type according to the prior art.

FIG. 1 shows the well-known integrated bucket-brigade circuit employing *n*-channel enhancement type transistors, in a section taken vertically in relation to a side surface of a plate-shaped semiconductor body 1. The drawing shows the input stage at the two first delaying stages including the gate electrodes $G_1$, $G_2$, $G_3$ on the insulated-gate layer 2.

Figure 2:
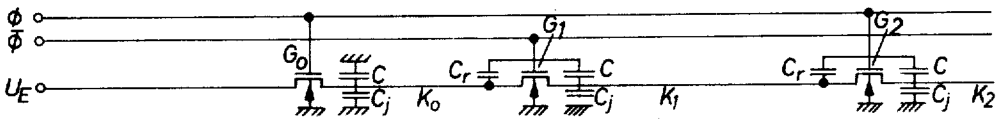
Fig.2 PRIOR ART
FIG. 2 is a circuit diagram corresponding to FIG. 1.

FIG. 2 shows the associated circuit diagram.

The capacitances are the operating or pumping capacitance:

$$C = Wl/c_{ox},$$

the feedback capacitance:

$$C_r = W \cdot \Delta e \cdot c_{ox}$$

and the depletion-layer capacitance:

$$C_j = W \cdot (1 + \Delta l + s)\, c_j$$

With $c_{ox} = \epsilon_o\epsilon_{si}/X_{ox}$ and $c_j = \sqrt{\epsilon_o\epsilon_{si} q N_A/2U}$.

W indicates the width of the structure vertically in relation to the plane of the drawing.

Figure 3:
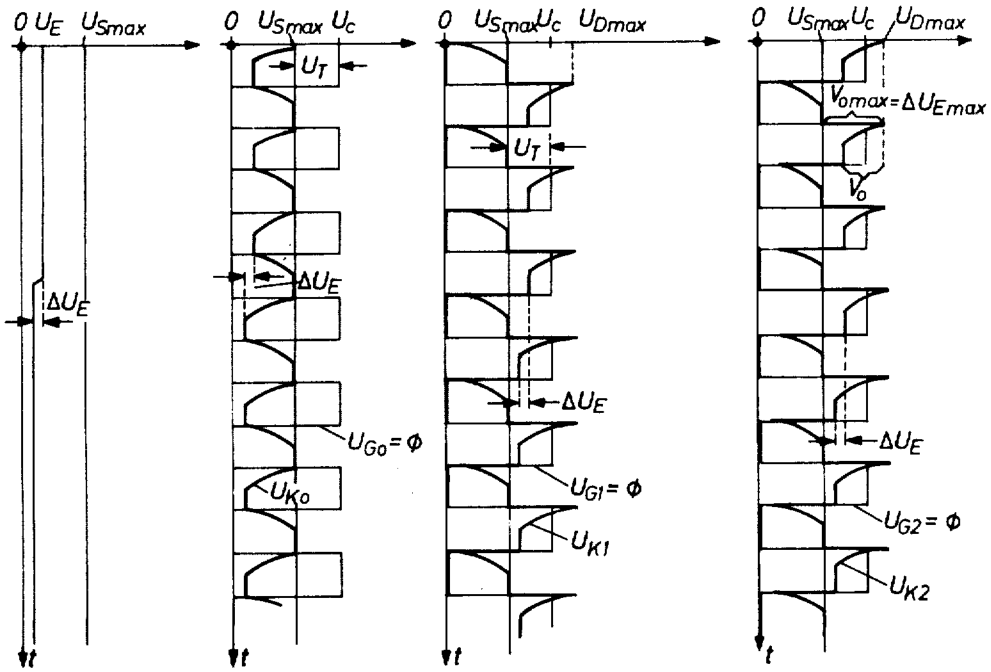
FIG. 3 shows potential curves at designated points in FIGS. 1 & 2.

FIG. 3 shows the potential curves $U_E(t)$, $U_{Ko}(t)$, $U_{K1}(t)$ and $U_{K2}(t)$ at the signal input of the line and at the junctions $K_o$, $K_1$ and $K_2$ after the input stage and after the two following stages. There is likewise shown the gate potential as occurring at the respective transistors ($U_{Go}$, $U_{G1}$, $U_{G2}$).

Figure 4:
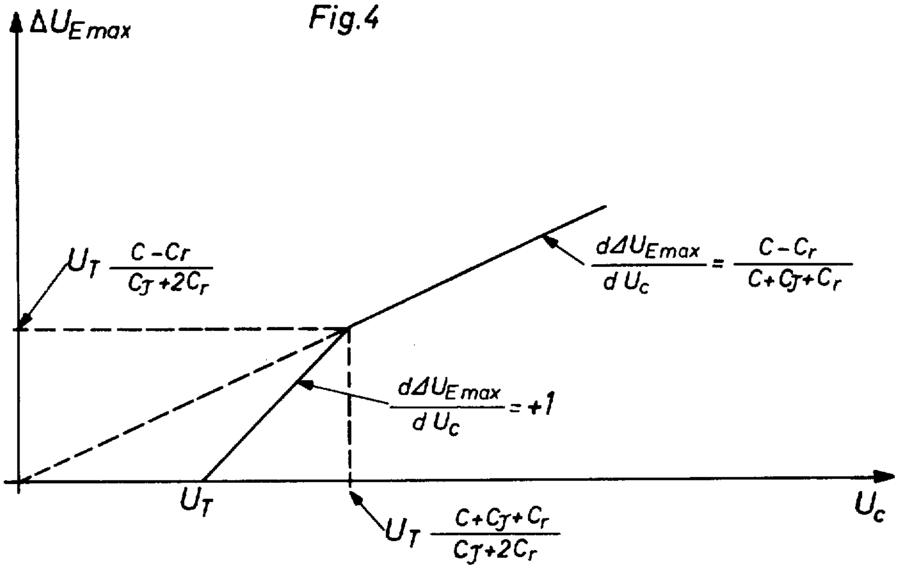
FIG. 4 is a graphical representation of the maximum control range.

It can be proved that the maximum control range of this enhancement line $\Delta U_{max} = U_{Emax} - U_{Emin}$ is dependent upon the amplitude $U_c$ of the clock signal $\phi$ or $\bar{\phi}$, and is to be represented by the relationship shown in FIG. 4 FIG. 4 also shows $\Delta U_{Emax}(U_c)$ in a graphical representation, wherein the following is applicable:

$$\Delta U_{Emax} = \begin{cases} 0 & \text{to } U_r < U_T \\ U_c - U_r & \text{to } U_T < U_c < U_T \dfrac{C + C_j + C_r}{C_j + 2C_r} \\ U_c \dfrac{C - C_r}{C + C_j + C_r} & \text{to } U_c > U_T \dfrac{C + C_j + C_r}{C_j + 2C_r} \end{cases}$$

The corresponding information supplied according to FIGS. 1, 2, 3 and 4 for the enhancement line, is supplied according to FIGS. 5, 6, 7 and 8 for an integrated bucket-brigade circuit according to the invention.

Figure 5:
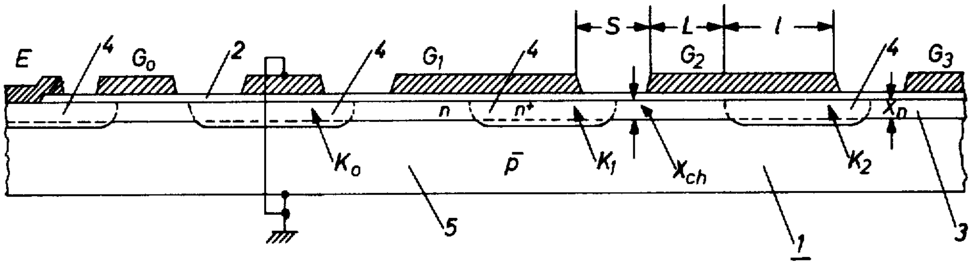
FIG. 5 shows in cross-section an integrated bucket-brigade circuit according to the invention.
Figure 6:
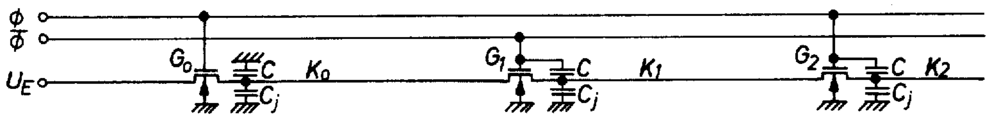
FIG. 6 shows the equivalent circuit diagram to the arrangement shown in FIG. 5.

FIG. 5, in a cross-sectional view taken vertically in relation to the semiconductor surface, shows the integrated bucket-brigade circuit according to the invention, while FIG. 6 shows the equivalent circuit diagram thereof.

When comparing FIGS. 5 and 1 asd well as FIGS. 6 and 2 there will be noticed the missing overlapping capacitances in the case of the depletion layer-type transistors in an integrated bucket-brigade circuit according to the invention. The $n^+$-diffusion pads 4 serving as a source or drain region between two neighboring transistors, do not need to pass through the *n*-region 3 having the thickness $x_n$, as is shown in FIG. 5. At a smaller depth they may also be embedded in the *n*-region 3. When producing the *n*-region 3 by way of ion implantation and/or diffusion, the doping by way of a selective masked application of the doping element (phosphorus, SB or As) can be restricted from the beginning to the channel width W. When depositing the n-region 3, however, by way of epitaxial growth, it is appropriate to apply a continuous layer and to restrict the width W, for example, by a subsequently following $p^+$-diffusion of the outer areas. Another possibility of restriction resides in the application of the known isoplanar or planox method. The $p^-$-substrate 5 can be chosen to be relatively high-ohmic without thus increasing the channel length modulation adding towards attenuation. Channel length modulation is primarily also determined by the doping of the *n*-region 3 itself which is divided among the channel regions.

Thus, there is provided the possiblity of optimizing the doping of the channel regions for achieving a small attenuation, as well as doping of the substrate 5 for achieving a low barrier-layer capacitance $C_j$ and, consequently, a large control range, independently of one another.

The thickness $x_n$ of the n-region 3 is to be dimensioned in such a way that in the case of the pinch-off voltage $U_P$, the two space charge zones of which the one is induced from the gate electrodes $G_1$, $G_2$, $G_3$ . . . and the other one from the substrate 5, will just meet against one another, and will thus just clear the $n$-region 3 having a thickness $x_n$. In the case of a homogeneous doping of the $n$-region 3, therefore, the thickness thereof is calculated in accordance with the following formula:

$$x_n = x_{RG} + x_{RS}$$

with $$x_{RG} = \sqrt{(U_P - U_{FB}) \frac{2\epsilon_0\epsilon_{si}}{qN_D} + \left(x_{ox} \frac{\epsilon_{si}}{\epsilon_{ox}}\right)^2} - x_{ox} \frac{\epsilon_{si}}{\epsilon_{ox}}$$

$$x_{RS} = \sqrt{(U_P + \frac{kT}{q} \ln \frac{N_D N_A}{n_i^2} \frac{2\epsilon_0\epsilon_{si}}{qN_D} \frac{1}{1 + N_D/N_A}}$$

With the numerical values:

$x_{ox} = 1300$ A $\quad n_i = 1{,}5 \times 10^{10}$ cm$^{-3}$
$\epsilon_{si} = 11{,}8 \quad N_D = 10^{16}$ cm$^{-3}$
$\epsilon_{ox} = 4 \quad N_A = 10^{15}$ cm$^{-3}$
$kT/q = 25$ mV and with flat band voltage $U_{FB} = 1.2$ V the following will be obtained e.g. with respect to a pinch-off voltage $U_P = 8$ V:

$$x_n = 0.95\ \mu\text{m}.$$

Figure 7:
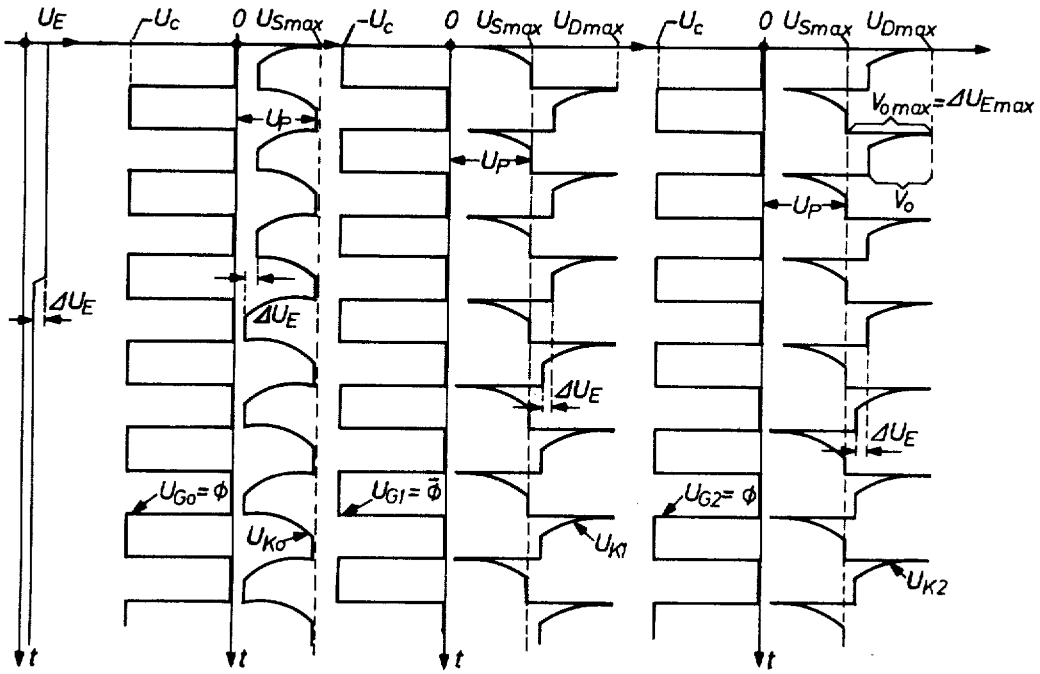
FIG. 7 shows potential curves in graphical form at designated points in FIG. 6.

FIG. 6 shows the circuit and FIG. 7 shows the potential curves.

Figure 8:
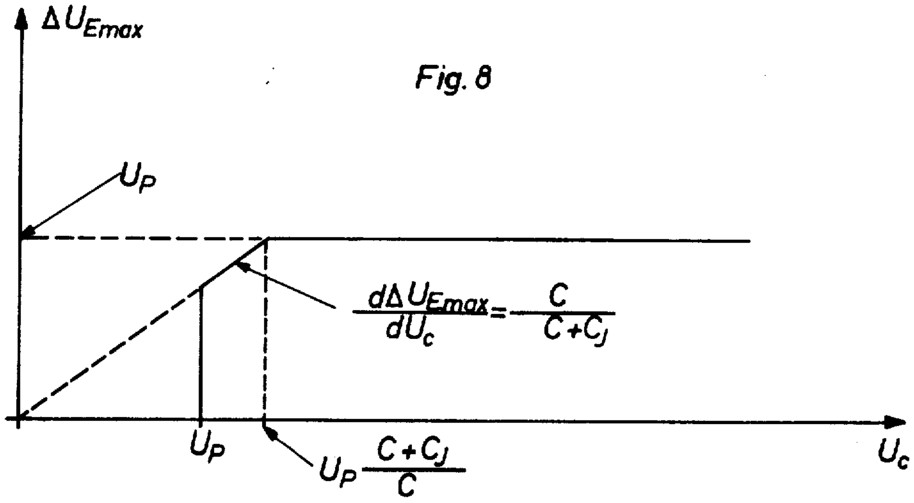
FIG. 8 shows in graphical form the relation between the maximum control range and the clock signal amplitude.

FIG. 8 shows the relationship between the maximum control range $\Delta U_{Emax}$ and the clock signal amplitude $U_C$ which is capable of being derived therefrom, and wherein the following is applicable:

$$\Delta U_{Emax} = \begin{cases} 0 & \text{for } U_c < U_p \\ U_C \dfrac{C}{C + C_J} & \text{for } U_p < U_c < U_p \dfrac{C + C_J}{C} \\ U_p & \text{for } U_c > U_p \dfrac{C + C_J}{C} \end{cases}$$

One important advantage of the bucket-brigade circuit employing MIS-depletion layer-type transistors will become evident when comparing FIG. 8 with FIG. 4. In the case of the enhancement type (FIG. 4), the maximum control range $\Delta U_{Emax}$ will reach the threshold voltage value $U_T$ only at a clock signal amplitude $U_C$ amounting to about double the threshold voltage value. In the case of the depletion layer type, however, $\Delta U_{Emax}$ will reach the pinch-off voltage value already at a clock signal amplitude lying just above the pinch-off voltage level. Further, the threshold voltage in the case of the enhancement type is relatively high owing to the substrate effect. Within the case of the depletion layer type it is possible, therefore, to achieve the same control range as in the case of the enhancement type employing a lower clock signal amplitude.

Figure 9:
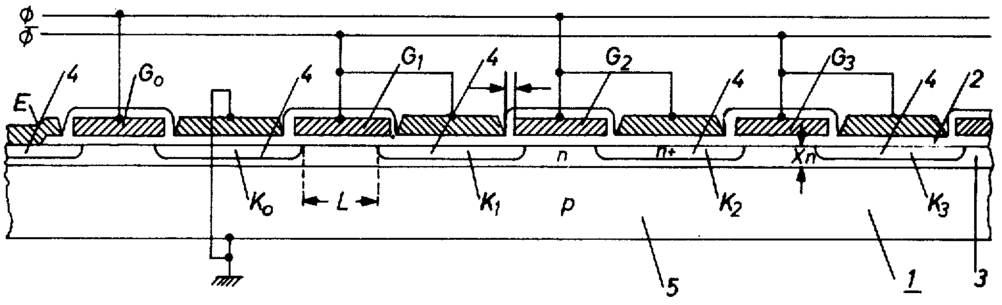
FIG. 9 shows a further embodiment of the invention.

FIG. 9 shows an example of embodiment which is in accordance with the silicon gate technology, i.e. employing gate electrodes $G_1, G_2, \ldots$ of polycrystalline silicon, in which case there will be a small overlap capacitance due to this underdiffusion. This minor disadvantage, however, is made up for by the advantage that the contact gap s (cf. FIGS. 1 and 5), i.e. the mutual spacing between the gate electrodes, can be reduced to about the strength of one gate-oxide thickness. On account of this the relationship $C_J/C$ will become smaller and the control range will be enlarged accordingly.

Figure 10:
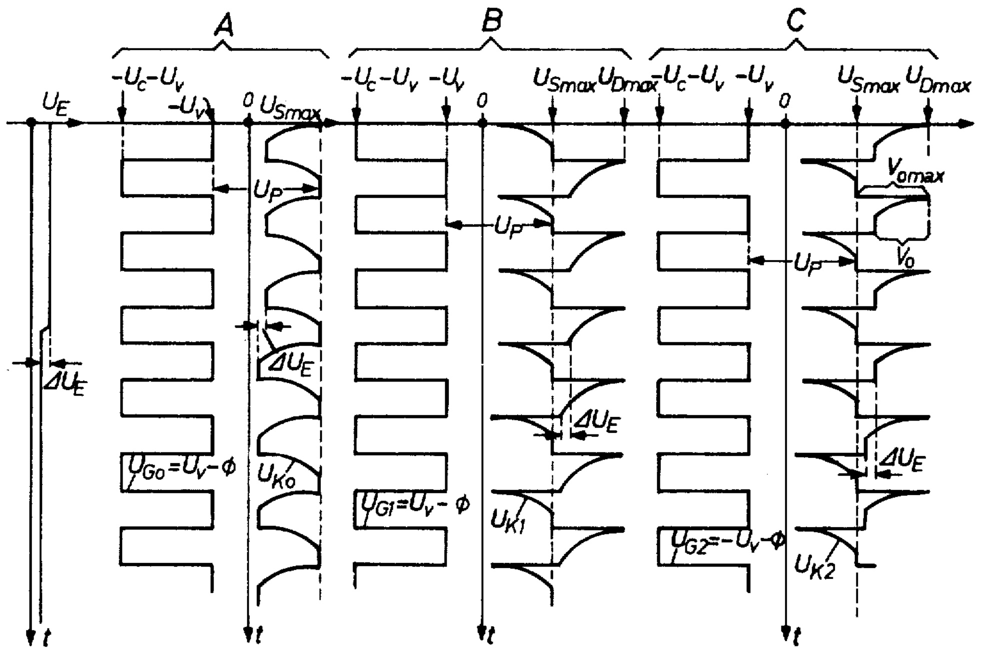
FIG. 10 is a graphical representation of potential curves according to FIG. 9.
Figure 11:
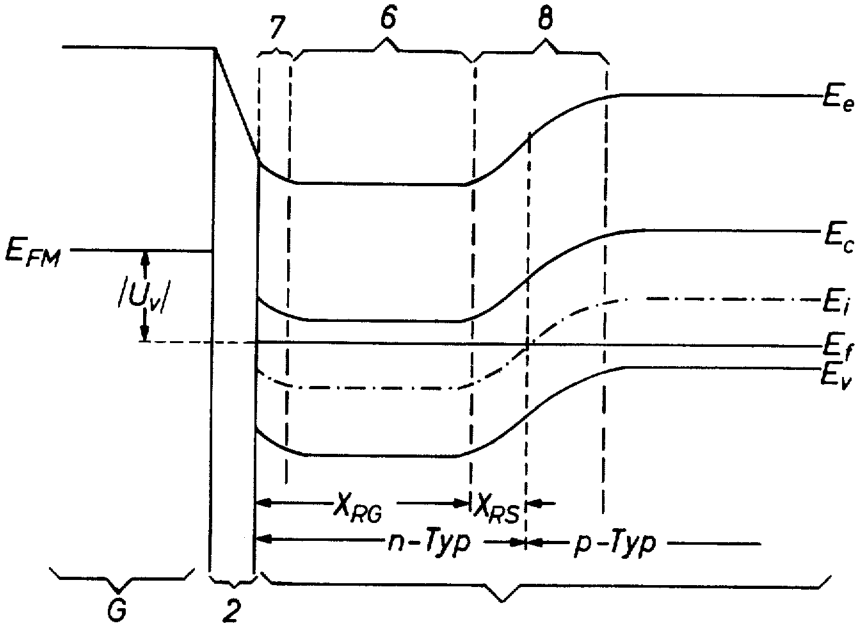
FIG. 11 shows in graphical form the potential characteristics corresponding to FIG. 9.
Figure 12:
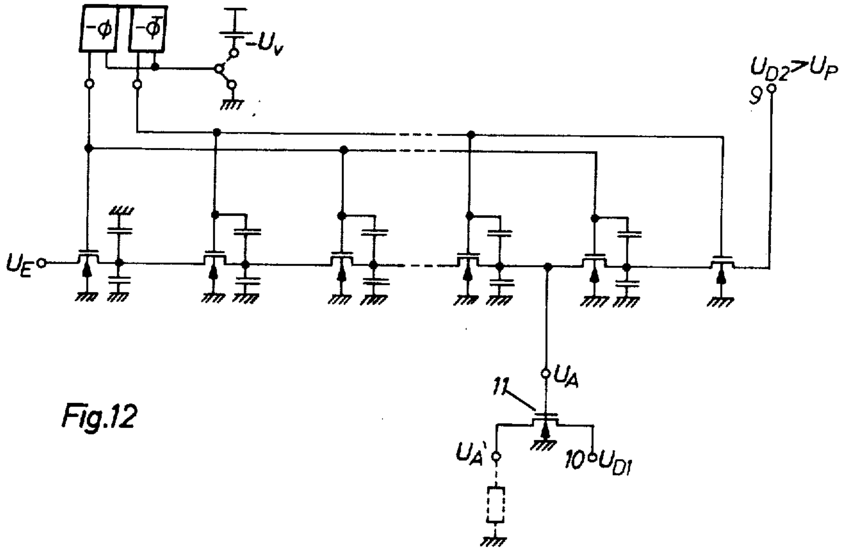
FIG. 12 is a circuit diagram of an integrated bucket-brigade circuit employing clock pulse generators.

FIGS. 10, 11, and 12 refer to the case where the clock pulses $-\phi$ and $-\overline{\phi}$ are superimposed upon a biasing potential $-U_V$. FIG. 10 shows the potential curves together with the biasing potential according to FIG. 7 where the same are shown without the biasing potentials. The curves shown below the brackets A, B, C successively refer to the voltage curves as functions of time at the input stage, at the first delay line stage and at the second delay line stage. FIG. 11 shows the potential characteristics vertically in relation to the surface of the MIS-structure employing the abbreviations customarily used in the band theory. $El$ indicates the potential energy of the electrons outside the surface of intersection. Please note the way in which the channel region 6 is embedded between two space-charge regions 7 and 8 (therefore bulk-mobility!), of which the space-charge region 7 at the insulated-gate layer 2 below the gate electrode G extends into the region 3 according to FIG. 9, and of which the space-charge region 8 extends into the substrate (FIG. 9).

FIG. 12 shows a circuit arrangement relating to the integrated bucket-brigade circuit according to the invention employing the clock-pulse generators for $-\phi$ and $-\overline{\phi}$, optionally either with or without the biasing potential $-U_V$, as well as with the optional outputs $U_A$ (direct) or $U_A'$ (via source follower). Please also note the voltage at terminal 9 which is required for functioning of the depletion bucket-brigade circuit. this voltage $U_{D2}$ should be higher, preferably double that of the pinch-off voltage $U_P$. Terminal 9 on the last drain region of the integrated bucket-brigade circuit is required for the proper functioning of the integrated bucket-brigade circuit according to the invention. Terminal 10 of the source-follower field-effect transistor 11 may be connected to the terminal, so that $U_{D1} = U_{D2}$.

While the principles of this invention have been descirbed above in connection with specific apparatus, it is to be understood that this description is made only by way of example and not as a limitation on the scope of the invention as set forth in the objects and features thereof and in the accompanying claims.

We claim:

1. An integrated bucket-brigade circuit wherein there is provided a plurality of stages each containing a transistor and a capacitor coupled between the gate and drain electrode thereof, and coupled together such that the drain electrode of each transistor is connected to the source electrode of the next successive transistor, and wherein a first clock signal is coupled to the gate terminals of even-numbered transistors and the complement of said first square wave clock signal controls the gate terminals of the odd-numbered transistors, comprising:

- a source of operating voltage;
- first and second sources of clock pulses, said first source coupled to said even-numbered transistors and said second source coupled to said odd-numbered transistors; and
- a row of field-effect transistors of the depletion-layer type having source and drain regions, said field-effect transistors employing gate electrodes on an insulated-gate layer, wherein the last transistor in said row is provided with an electrical terminal to which said source of operating voltage is coupled, said operating voltage having polarity opposite to the polarity of said clock pulses and having magnitude greater than the pinch-off voltage of said last transistor.

2. An integrated bucket-brigade circuit according to claim 1 wherein said field-effect transistors are $n$-channel devices.

3. An integrated bucket-brigade circuit according to claim 2 wherein said insulated-gate layer consists in part of an oxide.

4. An integrated bucket-brigade circuit according to claim 2 wherein said channel regions contain doping impurities of the same conductivity type as said source and drain regions.

5. An integrated bucket-brigade circuit according to claim 4 wherein said gate electrodes are polycrystalline silicon.

6. An integrated bucket-brigade circuit according to claim 5 wherein the spacing between adjacent gate electrodes equals the thickness of said insulated-gate layer.

* * * * *